United States Patent [19]

Wight

[11] 3,923,640

[45] Dec. 2, 1975

[54] LOW PRESSURE HYDROCRACKING PROCESS

[75] Inventor: Carlyle G. Wight, Fullerton, Calif.

[73] Assignee: Union Oil Company of California, Los Angeles, Calif.

[22] Filed: June 6, 1973

[21] Appl. No.: 367,456

[52] U.S. Cl. ............................................. 208/111
[51] Int. Cl.[2] ..................................... C10G 13/02
[58] Field of Search .................................. 208/111

[56] References Cited
UNITED STATES PATENTS

| | | | |
|---|---|---|---|
| 3,293,192 | 12/1966 | Maher et al. | 252/430 |
| 3,354,076 | 11/1967 | Beuther et al. | 208/111 |
| 3,354,077 | 11/1967 | Hansford | 208/111 |
| 3,507,812 | 4/1970 | Smith et al. | 252/455 |
| 3,595,611 | 7/1971 | McDaniel et al. | 252/455 |
| 3,781,199 | 12/1973 | Ward | 208/89 |
| 3,793,182 | 2/1974 | Ward | 208/111 |

Primary Examiner—Delbert E. Gantz
Assistant Examiner—James W. Hellwege
Attorney, Agent, or Firm—Richard C. Hartman; Henderson Lannas S.; Dean Sandford

[57] ABSTRACT

Catalytic hydrocracking is carried out at low pressures, below 1,200 psi, while maintaining a substantial class of catalysts which are found to be especially resistant to deactivation under such conditions. These catalysts comprise a Group VIII metal hydrogenating component supported upon a low sodium, hydrogen Y zeolite cracking base which has been subjected to thermal stabilization.

20 Claims, No Drawings

LOW PRESSURE HYDROCRACKING PROCESS

BACKGROUND AND SUMMARY OF INVENTION

In catalytic hydrocracking one of the most important economic factors contributing to the cost of the process resides in the need for maintaining a relatively high hydrogen pressure. At hydrocracking temperatures, coke and other carbonaceous material tend to deposit upon and progressively deactivate the catalyst. If however there is a sufficient partial pressure of hydrogen, this coking and deactivation can be brought essentially to an equilibrium level at which sufficient effective hydrocracking activity remains available to give the desired conversion at a relatively constant temperature for long periods of time. The hydrogen pressure required to achieve this equilibrium state varies with the nature of the catalyst.

Conventional hydrocracking catalysts based on amorphous cogel cracking bases such as silica-alumina sometimes require hydrogen pressures as high as 3,000 – 5,000 psi before an equilibrium activity state can be reached. With the advent of the newer hydrocracking catalysts based on crystalline zeolite cracking bases, it was found possible to reach equilibrium activity levels at considerably lower pressures, in the range of about 1,200 – 2,000 psi. However, even these pressures are very expensive in terms of the required heavy-walled reactors, heat exchangers, pressure vessels, etc, as well as the compressor capacity required. The hydrocracking process would become considerably more economical, both from capital investment and operating standpoints, if it could be operated successfully at pressures in the 300–1,000 psig range, this being the primary objecting of the present invention. objective Another objective of the present invention resides in achieving a successful low pressure hydrocracking process while at the same time maintaining a total, or at least a substantial, recycle of the unconverted oil. The difficulties outlined above pertaining to low pressure hydrocracking become particularly acute when it is desired to maintain a substantial recycle of the heavy unconverted oil. When operating at low pressures, utilizing a feedstock containing a substantial proportion of aromatic hydrocarbons, the unconverted oil tends to become more and more refractory as time goes on, due mainly to the buildup of condensedring polyaromatic compounds therein. In the past this problem has been one of the primary factors necessitating the use of high hydrogen pressures.

I have now discovered that hydrocracking catalysts based on a special class of thermally stabilized hydrogen Y zeolites are much more active and stable at low hydrogen pressures than are catalysts containing the same amount and type of hydrogenating component, but based on Y zeolites which have been stabilized by the introduction of polyvalent metal zeolitic cations into their structure. These thermally stabilized hydrogen Y zeolites are essentially Y zeolites which have been ion-exchanged with ammonium salts to very low sodium levels, below about one weight-percent $Na_2O$, and at one or more stages in their production have been stabilized against hydrothermal degradation by calcining at temperatures between about 900° and 1,600°F, preferably in the presence of steam.

As a result of their higher activity and stability at low hydrogen pressures, the catalysts of this invention can be successfully utilized at hydrogen pressures between about 300 and 1,200 psi to hydrocrack heavy, aromatic feedstocks, while maintaining a substantially total recycle of unconverted oil over long periods of time. Moreover, essentially stable equilibrium temperatures can be maintained to achieve higher conversions per pass at higher space velocities than can be achieved with analogous catalysts based on polyvalent metal-stabilized Y zeolites. This discovery came as somewhat of a surprise inasmuch as catalyst deactivation rates at a given hydrogen partial pressure are normally considered to be mainly a function of the activity of the hydrogenating component. However, in the present case, even when the respective hydrogenating components are as nearly the same as can be detected, the described differential activities are observed. But at conventional pressures in the range of about 1,200 – 2,000 psi, the respective differential activities are more nearly the same, which also is surprising.

In the patent literature many hydrocracking process disclosures can be found in which broad pressure ranges of for example 300 – 4,000 psig are recited, and in some cases recycle of unconverted oil is also suggested. It is therefore obvious that it is a physical possibility to operate with recycle at low pressures using essentially any type of hydrocracking catalyst. However, the present invention is based on my further discovery that the present catalysts can be utilized with recycle at the prescribed low pressures, while at the same time operating at economically feasible high space velocities, and at temperatures sufficiently high to give economically feasible conversions per pass. These objectives are achieved while at the same time maintaining a sufficiently low catalyst deactivation rate to give economical run lengths of at least about two months, and normally greater than six months. Insofar as I am aware, there are no prior art disclosures particularly pointing out means for achieving all of these objectives.

U.S. Pat. No. 3,692,666 to Pollitzer discloses a low pressure recycle hydrocracking process utilizing a catalyst comprising a halided cracking base. However there is no indication as to catalyst deactivation rates or run lengths, and it is notorious that halided cracking bases are rapidly deactivated if traces of water or ammonia are present. The catalysts described herein contain no halide component, and this is a distinct advantage in itself, considering the troublesome precautions which such catalysts require, including expensive metallurgy to resist corrosion, drying facilities for feed and recycle gas, etc.

DETAILED DESCRIPTION

A. Description of Catalysts

Effective catalysts for use herein comprise in general any crystalline, hydrothermally stabilized, low-sodium, metal-cation-deficient Y zeolite cracking base upon which is deposited a minor proportion of a Group VIII metal hydrogenating component. The term "metal-cation-deficient" refers to hydrogen and/or decationized Y zeolites in which less than 25 percent, preferably less than about 10 percent of the original sodium zeolite ion-exchange capacity is satisfied by metal cations. The term "hydrothermally stabilized" means a metal-cation-deficient Y zeolite which has been thermally or hydrothermally pretreated to achieve structural stability against the effects of steam at high temperatures. Quantitatively, "structural stability" is defined herein as meaning the ability to retain at least about 50 percent of original crystallinity and surface area after exposure to one atmosphere of steam at 1,000°F for two hours. Another critical characteristic of the Y zeolites utilized herein is their low sodium content, which must be less than 3 percent, and preferably less than one percent by weight, as $Na_2O$.

Conventional unstabilized metal-cation-deficient Y zeolites are normally produced by ion exchanging the original sodium zeolite with ammonium salt solutions until the sodium content has been reduced to below about 3 weight-percent, usually below 2 percent, as $Na_2O$. The resulting ammonium zeolite is then calcined under substantially dry conditions at temperatures of about 600°–1,200°F, usually about 800°–1,110°F, to decompose zeolitic ammonium ions and produce the desired hydrogen and/or decationized zeolite. When intimately composited with a hydrogenating metal such as palladium, this material forms a highly active hydrocracking catalyst, but is not hydrothermally stable. To achieve the desired hydrothermal stability, one conventional approach has been to back-exchange a substantial proportion of polyvalent metal ions into the ammonium zeolite prior to calcining, exemplary polyvalent metals being magnesium, calcium, rare earth metals, etc. I have found however that the introduction of such polyvalent metal cations substantially reduces the activity of such catalysts when utilized at the low pressures required herein.

To achieve the herein desired low-pressure activity as well as hydrothermal stability, the calcination step referred to above is carried out at temperatures of about 950°–1,800°F, preferably about 1,100°–1,650°F, and preferably in the presence of at least 0.2 psi of water vapor, still more preferably about 5 to 15 psi. It is not essential that steam be present during the entire calcination; it is entirely feasible to carry out a dry calcination to effect deammoniation, and thereafter carry out the steam calcination. Any suitable procedure may be utilized for maintaining the desired water vapor partial pressure in contact with the zeolite during at least an effective portion of the calcination treatment. In one modification, the wet zeolite from the exchange step can merely be heated in a covered container so as to retain the water vapor generated therefrom. Alternatively, the zeolite can be introduced into a batch or continuous rotary furnace, or a static bed calcination zone, into which preheated steam or humidified air is introduced. The duration of the calcination treatment is at least about 0.5 minutes, preferably about 30 minutes to about 4 hours. Suitable steam treatments are described more in detail in U.S. Pat. No. 3,354,077.

One effect of the hydrothermal stabilization calcination is a reduction in the unit cell size of the zeolite. This parameter can be used as a measure of the required calcination severity for the present purposes. The factors time, temperature and water vapor partial pressure should be correlated so as to effect at least about 0.2 percent, and preferably at least about 0.4 percent, reduction in unit cell size from the cell size of the original sodium Y zeolite. Higher temperatures and high steam pressures tend to accelerate stabilization and unit cell shrinkage. In the conventional prior art calcinations noted above, the time-temperature factors are in general of insufficient severity to bring about detectable unit cell shrinkage.

If desired, the stabilized zeolite produced as above described can be subjected to a second ammonium ion exchange step to further reduce the sodium content thereof, and the resulting product then again calcined, preferably under dry conditions, to effect deammoniation thereof. The second calcination is conducted at temperatures between about 750° and 1,300°F, preferably about 800°–1,000°F. The product resulting from such a double-exchange, double-calcination procedure is not only hydrothermally stable, but is stable in the presence of ammonia and water vapor.

A herein preferred modification of the stabilized zeolite described above is prepared by carrying out the final calcination after mixing the zeolite with a finely divided, hydrous metal oxide such as alumina, as described more particularly in copending application Ser. No. 191,123, filed Oct. 11, 1971. The resulting composition is hydrothermally stable and also stable in the presence of ammonia and water vapor. This preferred zeolite is prepared as follows:

The initial sodium Y zeolite starting material, containing about 10–14 weight-percent of sodium as $Na_2O$, is first digested in conventional manner with an aqueous solution of a suitable ammonium salt such as the chloride, nitrate, sulfate, carbonate, acetate, etc. to replace at least about 20 percent but not more than about 95 percent, of the original sodium ions with ammonium ions. The sodium content should be reduced to about 0.6–5 percent, preferably about 1–4 percent by weight, as $Na_2O$. To reduce the sodium level to this value, it may be desirable to employ two or more stages of exchange treatments. If it is desired to remove less than about 50 percent of the sodium in this step, dilute acids, e.g., 0.01N $HNO_3$, may be used instead of ammonium salts. The initial steam calcination is then carried out as described above.

The resultant steam-calcined zeolite is then reexchanged with ammonium salt solution under sufficiently severe conditions to reduce the sodium content to less than about 3 weight-percent, usually less than one percent, and preferably less than about 0.6 percent, as $Na_2O$. It should be realized that this second exchange treatment does not introduce any appreciable amount of ammonium ions into the exchange sites which were converted to hydrogen and/or decationized sites in the first calcination step; nearly all of the ammonium ions which go into the zeolite at this point do so by replacing remaining sodium ions. Since a substantial ammonium zeolite moiety is desired in the final calcination step for conversion to active exchange sites during the final calcination, it will be apparent that sufficient sodium should be initially present at the second exchange step to permit a substantial portion of the ion exchange capacity to become satisfied by ammonium ions. Accordingly, the zeolite subjected to the second ion exchange step should contain sufficient sodium remaining from the first exchange step to provide in the double-exchanged zeolite an amount of ammonium ion corresponding to at least about 5 relative percent, preferably 10–20 percent, of the original ion exchange capacity of the zeolite.

Prior to the final calcination step, preferably following the second exchange step, the zeolite component is intimately admixed with a finely divided, hydrous, refractory oxide of a difficultly reducible metal. The term "hydrous" is used to designate oxides having structural surface hydroxyl groups detectable by infra red analysis. The preferred oxides are alumina, silica, magnesia, beryllia, zirconia, titania, thoria, chromia, and combinations thereof such as silica-alumina, silica-magnesia, and the like. Naturally occurring clays comprising silica and alumina may also be utilized, preferably after acid treatment. The resulting mixtures may contain between about 5 and 98 weight-percent of zeolite, preferably at least about 10 percent, and generally about 20 to 80 percent, based on the combined dry weight of the zeolite and the metal oxide. The metal oxide can be combined with the zeolite as a hydrous sol or gel, as an anhydrous activated gel, a spray dried powder or a calcined powder. In one modification a sol or solution of the metal oxide precursor, such as an alkali metal silicate or aluminate, can be precipitated to form a gel in the presence of the zeolite.

When less hydrous forms of the metal oxide are combined with the zeolite, essentially any method of effecting intimate admixture of the components may be utilized. One such method is mechanical admixture, e.g., mulling, which involves admixing the zeolite in the form of a powder with the slightly hydrous, finely divided form of the metal oxide. Minor amounts of water, with or without an acidic peptizing agent such as a strong mineral acid, are usually added to facilitate admixture.

After admixing the hydrous oxide with the zeolite component, it is normally preferable at this point to form the mixture into the shape desired for the final catalyst. Conventional tableting, prilling, or extruding procedures may be utilized to produce tablets, prills or extrudate pellets having a diameter of about 1/32 inch to ⅜ inch. Other conventional pelleting aids may be added such as lubricants, binders, diluents, etc.

The pelleted zeolite-metal oxide composition is then subjected to a second calcining at temperatures between about 750° and 1,300°F, preferably about 800°–1,000°F. It is preferred to maintain a relatively anhydrous environment during this second calcination. If there is a substantial water vapor partial pressure during this step, the final catalyst is usually less active than those produced in the substantial absence of water vapor. Accordingly, this calcination is preferably conducted in the presence of less than 2, and preferably less than about 1, psi of water vapor. The calcination may be regarded as complete when substantially all water and ammonia have been expelled from the catalyst, which, depending on the temperature employed, may range between about 10 minutes and 12 hours or more.

In the foregoing description of double-exchanged, double-calcined zeolites, a common characteristic resided in utilizing relatively high temperatures for the first calcination and relatively low temperatures for the second. This is the preferred sequence for obtaining zeolites which are both hydrothermally stable and ammonia stable. However, the calcinations can be reversed with the low temperature calcination being performed first and the high temperature second. This procedure is described in more detail in U.S. Pat. No. 2,293,192, the product thereof being termed Zeolite Z-14US (ultrastable). This material, though not stable in hydrous ammonia environments, can be successfully utilized in environments free of one or both of ammonia and water vapor.

The necessary metal hydrogenation component may be distributed selectively on the zeolite component of the catalyst, or on the amorphous oxide component. Alternatively it may be distributed more or less equally on both components. Effective hydrogenation components comprise the Group VIB and/or Group VIII metals and their oxides and/or sulfides, with or without other metals such as rhenium. Operative proportions (based on free metal) may range between about 0.1 percent and 30 percent by weight, depending upon the type of metal or metals selected, and the desired activity. In the case of the Group VIII noble metals, amounts in the range of 0.1 to about 2 percent will normally be employed; the iron group metals, iron, cobalt and nickel, are normally utilized in proportions of about 1–10 weight-percent; the Group VIB metals will normally be utilized in proportions of about 3–20 weight-percent. Preferred hydrogenating metals are palladium, platinum, nickel, cobalt, tungsten and molybdenum. Particularly preferred are palladium, or combinations of nickel and/or cobalt with molybdenum and/or tungsten.

The hydrogenating component may be added to the catalyst at any desired stage in its manufacture. Preferred methods include impregnation and/or ion-exchange of soluble metal salts into the powdered zeolite after the second ammonium ion exchange, or into the catalyst pellets prior to the final calcination step. Other methods include mixing of soluble or insoluble compounds of the desired metal or metals with the powdered zeolite-hydrous metal oxide mixture prior to extruding or pelleting.

B. Process Description

In broad aspect the process simply involves passing the desired feedstock along with added hydrogen through a hydrocracking reactor containing a stabilized Y zeolite catalyst as above described, cooling and condensing the reactor effluent to recover hydrogen-rich recycle gas, fractionating the liquid condensate to recover the desired low boiling product or products, and recycling the desired portion of unconverted oil. It will be understood that this "unconverted" oil will contain substantially all of the heaviest components present in the reactor effluent, and will comprise at least the highest boiling 2 volume-percent thereof. Operative hydrocracking conditions are as follows:

| Hydrocracking Conditions | Broad Range | Preferred Range |
|---|---|---|
| Temperature, °F | 450 – 850 | 500 – 750 |
| H$_2$ Partial Pressure, psi | 300 – 1200 | 400 – 800 |
| LHSV | 0.75 – 10 | 1.0 – 5 |
| H$_2$/Oil Ratio, MSCF/B | 2 – 15 | 4 – 10 |

At any given space velocity within the above ranges, an appropriate temperature is selected to give a desired conversion per pass. Normally it is desirable to convert at least about 30, and preferably at least about 40 volume-percent per pass to products boiling below the initial boiling point of the feed. Exemplary products are 400°F end-point gasolines, light gasolines, turbine fuels, diesel fuels, kerosene and the like.

In the low pressure range of about 300–550 psi, and at the relatively high space velocities specified above, the catalysts of this invention are more susceptible to deactivation when the conversion per pass exceeds about 60 volume-percent. Hence, in order to achieve the desired run lengths of at least 30 days, the conversion per pass should be limited to about 30–60 volume percent when operating in this low pressure range. However, at pressures above about 550 psi, it has been found feasible to operate for several months at 80–85 percent conversion per pass, even at a space velocity of 3.0 and with total recycle of unconverted oil.

Ordinarily it is desirable to recycle to the hydrocracker essentially all of the unconverted oil boiling above the end-boiling-point of the desired product or products. However, in some cases it may be desirable to divert a portion of the unconverted oil for use as fuel oil, or as feed to catalytic cracking operations, or for other purposes. The higher the proportion of oil which is recycled, and the lower the pressure, the more unexpected are the low catalyst deactivation rates which accrue. Based on experience with other catalysts, it was unexpected to find that runs of at least 30 days duration were readily obtainable under the above operating conditions, while recycling a percentage of unconverted oil equal to or greater than $(P + 1,200)/24$, where P is the hydrogen pressure in psi prevailing in the hydrocracking zone. It will be seen that this relationship means that at the maximum pressure of 1,200 psi, all of the unconverted oil must be recycled, and at the minimum pressure of 300 psi at least 62.5 percent would be recycled. It was even more unexpected to find that such an operation is feasible when the percent of unconverted oil being recycled is equal to or greater than $(P + 1,000)/20$. In this relationship, at the maximum included pressure of 1,000 psi, all of the unconverted oil must be recycled, while at the minimum pressure of 300 psi at least 65 percent would be recycled. In the preferred pressure range of 400–800 psi, at least 90 percent of the unconverted oil would be recycled at 800 psi, and at least 70 percent at 400 psi. Under these severe conditions of recycle, low pressure, relatively high conversion rates per pass, and relatively high space velocities, unexpectedly low catalyst deactivation rates are observed such that run lengths of at least 30 days are obtained, and normally at least six months.

Catalyst deactivation rates are measured herein in terms of the average daily temperature increase required to maintain the preselected conversion per pass. This temperature increase requirement (TIR) will be high at the beginning of a run with a fresh catalyst, but generally levels out within about 20–30 days to a value of less than about 2°, and normally less than 1°F per day. Thus, run lengths of at least about 4 months, and normally 6 months to about 2 years are obtainable.

C. Feedstocks

The hydrocracking feedstocks which may be treated herein include in general any mineral oil fraction boiling above the boiling range of the desired product, and containing at least about 15 and preferably at least about 25 volume-percent of aromatic hydrocarbons, and at least about 25, preferably at least about 40 volume-percent of components boiling above about 500°F. Included primarily are fractions boiling above about 350°F and usually above about 400°F, and having an end-boiling-point of up to about 1,200°F. This includes straight run gas oils and heavy naphthas, coker distillate gas oils, deasphalted crude oils, cycle oils derived from catalytic or thermal cracking operations, and the like. Such fractions may be derived from petroleum crude oils, shale oils, tar sand oils, coal hydrogenation products and the like. Specifically, it is preferred to employ feedstocks boiling between about 400° and 900°F, having an API gravity of about 20° to 40°, and containing less than about 5 ppm of organic nitrogen. Feedstocks richer in nitrogen are preferably subjected to a prehydrofining operation.

Although organic nitrogen compounds, and to some extent organic sulfur compounds, cannot be tolerated in significant amounts in the hydrocracking zone, it is noteworthy that the zeolite catalysts of this invention are much more tolerant to ammonia and hydrogen sulfide which may be generated in conventional prehydrofining operations. This tolerance is found to extend also to the low pressure operations described herein, and hence an "integral" operation is feasible, with total effluent from the hydrofiner passing into the hydrocracker without intervening condensation or separation of $NH_3$ and $H_2S$. The presence of ammonia, and to a lesser extent $H_2S$, requires the use of higher hydrocracking temperatures to maintain the desired conversion, but the significant factor is that these temperatures are essentially stable after, e.g., 20–30 days operation, the TIR being less than about 1°F per day, and normally less than about 0.5° per day.

EXAMPLES 1–2

Preparation of Catalysts

Catalyst A

Sodium Y zeolite was ion exchanged with ammonium sulfate solution until the sodium content was reduced to 1.5 – 2 weight-percent $Na_2O$. The resulting ammonium-sodium zeolite was then calcined in flowing steam for one hour at 1,250°F and then further ion exchanged with ammonium salt solution until the sodium content was reduced to less than 0.2 percent $Na_2O$. The resulting product was then slurried in dilute ammonium hydroxide, into which a solution of palladium chloride in dilute ammonium hydroxide was slowly stirred. The product was washed free of chloride, mixed with 20 weight-percent (dry basis) of acid-peptized alumina, extruded into ⅛ inch pellets, dried and calcined at about 900°F. for one hour. The finished catalyst contained about 0.5 weight-percent $Pd$, and the unit cell size of the zeolite was 24.483 A.

Catalyst B was a more conventional $Pd$-Y zeolite catalyst comprising a copelleted composite of 20 weight-percent alumina, 80 weight-percent of a magnesium back-exchanged hydrogen Y zeolite (3 weight-percent MgO), and 0.5 weight-percent of Pd. This catalyst had not been subjected to hydrothermal stabilization, but was hydrothermally stable by virtue of its zeolitic magnesium content.

EXAMPLES 3–6

Catalysts A and B above were evaluated for hydrocracking activity at hydrogen pressures of about 700 psi and 1,500 psi, using as the feed a mixture of catalytic cracking cycle oils and straight run gas oils having a gravity of 23.8°API, a boiling range of about 400°–850°F (50 percent boiling above 650°F, ASTM D-1160), containing about 56 volume-percent aromatics, 1.3 weight-percent sulfur and 0.22 weight-percent nitrogen. This feed was first hydrofined to reduce the organic nitrogen content to about 1 ppm, and total effluent from the hydrofiner, including the $NH_3$ and $H_2S$ generated therein, was subjected to hydrocracking over the respective catalysts at temperatures adjusted to give 50 volume-percent conversion per pass to $C_4$-400°F gasoline. The product boiling above 400°F was recycled to extinction in the hydrocracker. After 6 days of operation in this manner, the principal conditions and results of the runs were as follows:

Table 1

| Run No. | 3 | 4 | 5 | 6 |
|---|---|---|---|---|
| Operating Conditions | | | | |

Table 1-continued

| Run No. | 3 | 4 | 5 | 6 |
|---|---|---|---|---|
| Catalyst | A | B | A | B |
| H$_2$ Pressure, psi | 1500 | 1500 | 700 | 700 |
| Temp., °F (Av. Bed) | 678 | 717 | 664 | 721 |
| LHSV | 2.05 | 2.05 | 1.0 | 1.0 |
| Conversion/Pass | 50 | 50 | 50 | 50 |
| H$_2$/Oil Ratio, MSCF/B | 8 | 8 | 8 | 8 |
| Catalyst Deactivation Rate (TIR), °F/Day | 0.7 | 1.1 | 0.5 | 2.9 |
| Yields, 100% Conversion, Based on Fresh Feed | | | | |
| C$_1$-C$_3$, SCF/B | 73 | 91 | 102 | 160 |
| Butanes, vol-% | 13.3 | 15 | 13.2 | 16.4 |
| C$_5$-185°F Gaso., vol-% | 28.1 | 30.3 | 27.5 | 30.2 |
| C$_5$-400°F, vol-% | 112 | 110 | 111 | 106 |
| C$_4$-400°F, vol-% | 125 | 125 | 124 | 122 |

A salient point to note above is that catalysts A and B at 1,500 psi were deactivating at similar rates after 6 days, while at 700 psi catalyst B was deactivating at almost six times the rate of catalyst A. Moreover, at 1,500 psi there was only a 39°F difference between the two catalysts in temperature required for 50 percent conversion, while at 700 psi the difference was 57°F. It is therefore apparent that catalyst A is unexpectedly much superior to catalyst B for low pressure hydrocracking. It should be noted also that at 700 psi, catalyst B gave considerably higher yields of light gases and butanes than did catalyst A.

In run No. 5, the deactivation rate of 0.5°F at a hydrocracking temperature of 664°F means, by straight-line projection, that a run length of at least 172 additional days would be obtainable before the preferred maximum temperature of 750°F is reached. In run No. 6 however, the corresponding projected run length would be only 10 days.

EXAMPLE 7

An extended 69-day hydrocracking run was carried out using a presulfided and preammoniated version of catalyst A from the preceding examples. The presulfiding and preammoniation treatments were designed to control the initial "wild" activity of the catalyst with respect to the new feedstock, which was a prehydrofined blend of straight-run and light catalytic cracking cycle oils having the following characteristics:

| Boiling Range, °F | |
|---|---|
| Initial | 178 |
| 5% | 433 |
| 50% | 544 |
| 95% | 665 |
| End Point | 716 |
| Composition | |
| Total Saturates, wt-% | 65.8 |

-continued

| Boiling Range, °F | |
|---|---|
| Total aromatics, wt-% | 34.3 |
| Nitrogen, ppm | 1.0 |
| Sulfur, ppm | 12.5 |
| Gravity, °API | 33.9 |

The entire run was carried out at 3.0 LHSV with 7000 SCF/B of hydrogen, while periodically varying the pressure to determine its effect on catalyst deactivation rates and product distribution. Temperatures were controlled throughout the run to maintain essentially 80 volume-percent conversion per pass to C$_4$-400°F gasoline, the unconverted oil being recycled to extinction. Toward the end of the run, conditions were altered by first adding tert butylamine to the feed, then tert butylamine plus thiophene. The principal conditions and results were as follows:

Table 2

| Run Period | A | B | C | D | E | F | G |
|---|---|---|---|---|---|---|---|
| Pressure, psig | 700 | 500 | 700 | 700 | 700 | 700 | 700 |
| Cat. Age, Days | 15.5 | 31 | 47.5 | 51.5 | 54 | 57.5 | 68 |
| S in Feed, ppm | 12 | 12 | 12 | 12 | 12 | 95 | 105 |
| N in Feed, ppm | 1 | 1 | 1 | 10 | 5.5 | 10 | 20 |
| Avg. Bed Temp, °F | 584 | 633 | 606 | 621 | 617 | 628 | 631 |
| TIR, °F/Day | 2 | 7 | neg. | neg. | neg. | neg. | nil |
| Product Yields | | | | | | | |
| C$_1$-C$_3$, SCF/B ff | 61 | 135 | 110 | 68 | 88 | 89 | 82 |
| Butanes, vol-% ff | 20 | 28.3 | 26.5 | 19.4 | 21.5 | 21 | 19.5 |
| C$_7$-400°F Gasoline | 68.5 | 54.3 | 58.9 | 67.0 | 64.2 | 65.8 | 68.3 |
| C$_4$-400°F Gasoline | 123 | 122 | 123 | 123 | 123 | 122 | 121 |
| Aromatics in Recycle oil, vol-% | 3.8 | 18.1 | 7.6 | 5.8 | 5.4 | — | 10.1 |

Run period A was of too short duration (2.2 days) to achieve stable conditions; hence the 2° TIR is relatively meaningless. The 7° TIR at the end of run period B was undesirably high, indicating that at the 500 psi pressure level 80 percent conversion per pass was placing too great a load on the catalyst. At a lower conversion level of, e.g., 60 percent per pass, previous experience indicates that acceptable TIR values would be achieved. In run periods C, D, E and F, the negative TIR values indicate that for a period of several days after raising the pressure back to 700 psi the catalyst was still recovering from the partial deactivation it underwent during the 500 psi run period. In run period G, the catalyst had reached a steady state activity level, such that over a period of 8.6 days the TIR was zero, at 631°F. This result is quite remarkable, especially in view of the presence of both H$_2$S and NH$_3$ and the high aromatic content of the recycle oil.

The following claims and their obvious equivalents are intended to define the true scope of the invention.

I claim:

1. A process for the hydrocracking of a mineral oil feedstock containing at least about 15 volume-percent of aromatic hydrocarbons and at least about 25 volume-percent of components boiling above 500°F, which comprises:
   1. contacting said feedstock plus added hydrogen with a catalyst comprising a Group VIII metal hydrogenating component supported on a metal-cation-deficient Y zeolite base containing less than about 1 weight-percent sodium as Na$_2$O, said Y zeolite base having been stabilized by calcining an ammonium form thereof for a time and at a temperature sufficient to reduce the unit cell size thereof by at least about 0.2 percent, said contacting being carried out at a space velocity between about 0.75 and 10, a hydrogen pressure between about 300 and 1200 psi, and at a temperature correlated with space velocity to give a conversion per pass to products boiling below the initial boiling point of said feedstock of at least about 30 volume-percent but sufficiently low to maintain catalyst activity for the hereinafter recited run length of at least 30 days;

2. separating the effluent from step (1) into a desired low-boiling product fraction and an unconverted oil fraction comprising the highest-boiling components of said effluent; and 3. recycling to step (1) over a period of at least about 30 days a percentage of said unconverted oil which is at least equal to $(P + 1,200)/24$, where P is the hydrogen pressure in psi prevailing in step (1).

2. A process as defined in claim 1 wherein said hydrogen pressure in step (1) is between about 300 and 1,000 psig, said space velocity is between about 1.0 and 5, and wherein said percentage of recycle in step (3) is at least equal to $(P + 1,000)/20$.

3. A process as defined in claim 1 wherein said percentage of recycle in step (3) is essentially 100 percent.

4. A process as defined in claim 1 wherein said temperature in step (1) is correlated with space velocity so as to give at least about 40 volume-percent conversion per pass to products boiling below the initial boiling point of said feedstock.

5. A process as defined in claim 1 wherein said hydrogenating component comprises palladium.

6. A process as defined in claim 1 wherein said hydrogenating component is selected from the class consisting of cobalt and nickel and the oxides and sulfides thereof.

7. A process as defined in claim 6 wherein said catalyst also comprises a hydrogenating component selected from the class consisting of molybdenum and tungsten, and the oxides and sulfides thereof.

8. A process as defined in claim 1 wherein said calcination in step (1) is carried out at a temperature between about 950° and 1,800°F.

9. A process as defined in claim 8 wherein said calcination is carried out in the presence of at least about 0.2 psi of steam.

10. A process as defined in claim 1 wherein said hydrogen pressure in step (1) is between about 400 and 800 psi.

11. A process for the hydrocracking of a mineral oil feedstock containing at least about 15 volume-percent of aromatic hydrocarbons and at least about 25 volume-percent of components boiling above 500°F, which comprises:

1. contacting said feedstock plus added hydrogen with a catalyst comprising a Group VIII metal hydrogenating component supported on a composite of (1) a refractory amorphous oxide of a difficultly reducible metal and (2) a thermally stabilized, metal-cation-deficient Y zeolite containing less than about 0.6 weight-percent sodium as $Na_2O$, said contacting being carried out at a space velocity between about 0.75 and 10, a hydrogen pressure between about 300 and 1,200 psi, and at a temperature correlated with space velocity to give a conversion per pass to products boiling below the initial boiling point of said feedstock of at least about 30 volume-percent but sufficiently low to maintain catalyst activity for the hereinafter recited run length of at least 30 days, said composite catalyst support having been prepared by:

a. calcining an ammonium Y zeolite containing about 1–4 weight-percent $Na_2O$ at a temperature between about 1,100° and 1,650°F in the presence of at least about 0.2 psi of water vapor for a sufficient time to reduce its unit cell size by at least about 0.2 percent;

b. subjecting the resulting product to further ammonium ion exchange to reduce the sodium content to below about 0.6 weight-percent $Na_2O$;

c. admixing the resulting product with a minor proportion of a hydrous, refractory amorphous oxide of a difficultly reducible metal, and shaping the resulting mixture into pellets of desired form and size; and d. calcining the resulting pellets at temperatures between about 750° and 1,300°F;

2. separating the effluent from step (1) into a desired low-boiling product fraction and an unconverted oil fraction comprising the highest boiling components of said effluent; and 3. recycling to step (1) over a period of at least about 30 days a percentage of said unconverted oil which is at least equal to $(P + 1,200)/24$, where P is the hydrogen pressure in psi prevailing in step (1).

12. A process as defined in claim 11 wherein said hydrogen pressure in step (1) is between about 300 and 1,000 psig, said space velocity is between about 1.0 and 5, and wherein said percentage of recycle in step (3) is at least equal to $(P + 1,000)/20$.

13. A process as defined in claim 11 wherein said percentage of recycle in step (3) is essentially 100 percent.

14. A process as defined in claim 11 wherein said temperature in step (1) is correlated with space velocity so as to give at least about 40 volume-percent conversion per pass to products boiling below the initial boiling point of said feedstock.

15. A process as defined in claim 11 wherein said hydrogenating component comprises palladium.

16. A process as defined in claim 11 wherein said hydrogenating component is selected from the class consisting of cobalt and nickel and the oxides and sulfides thereof.

17. A process as defined in claim 16 wherein said catalyst also comprises a hydrogenating component selected from the class consisting of molybdenum and tungsten, and the oxides and sulfides thereof.

18. A process as defined in claim 11 wherein said hydrogen pressure in step (1) is between about 400 and 800 psi.

19. A process as defined in claim 11 wherein said refractory amorphous oxide is essentially alumina.

20. A process as defined in claim 19 wherein said hydrogen pressure in step (1) is between about 400 and 800 psi and said percentage of recycle of unconverted oil in step (3) is essentially 100 percent.

* * * * *